US006574477B1

(12) United States Patent
Rathunde (10) Patent No.: US 6,574,477 B1
(45) Date of Patent: Jun. 3, 2003

(54) DYNAMIC LOAD BALANCING DURING MESSAGE PROCESSING IN A WIRELESS COMMUNICATION SERVICE NETWORK

(75) Inventor: Dale Frank Rathunde, Geneva, IL (US)

(73) Assignee: Lucent Technologies Inc., Murray Hill, NJ (US)

(*) Notice: Subject to any disclaimer, the term of this patent is extended or adjusted under 35 U.S.C. 154(b) by 0 days.

(21) Appl. No.: 09/413,259

(22) Filed: Oct. 6, 1999

(51) Int. Cl.[7] ............................. H04Q 7/20; H04B 1/38
(52) U.S. Cl. ........................................ 455/453; 455/561
(58) Field of Search ............................. 455/453, 424, 455/452, 8, 524, 525, 560, 561, 422; 370/216, 217, 219, 220, 221

(56) References Cited

U.S. PATENT DOCUMENTS 4,985,904 A * 1/1991 Ogawara ................... 375/260
5,697,054 A * 12/1997 Andersson .................. 455/524
5,796,717 A * 8/1998 Shinbashi et al. ........... 370/216

* cited by examiner

Primary Examiner—Charles N. Appiah
(74) Attorney, Agent, or Firm—Walter W. Duft (57) ABSTRACT

A system and method for performing dynamic load balancing during system operation between a pair of APs (AP pair) serving at least one cell in common. A first RCS instance runs as an active RCS instance on one member of the AP pair and a second RCS instance runs as a standby RCS instance on the other member of the AP pair. The first RCS instance is redesignated as a standby RCS instance for the cell and the second RCS instance is redesignated as an active RCS instance for the cell. Active message processing is then transferred from the first RCS instance to the second RCS instance during network operation and without service interruption to the cell.

21 Claims, 3 Drawing Sheets

DYNAMIC LOAD BALANCING DURING MESSAGE PROCESSING IN A WIRELESS COMMUNICATION SERVICE NETWORK

CROSS-REFERENCE TO RELATED APPLICATIONS

Not Applicable

STATEMENT REGARDING FEDERALLY SPONSORED RESEARCH OR DEVELOPMENT

Not Applicable

BACKGROUND OF THE INVENTION

1. Field of the Invention

This invention relates to wireless communication networks, including networks servicing cellular telephones, personal communication systems, and the like. More particularly, the invention concerns an apparatus and method to increase call capacity through load balancing of signaling traffic workload in a wireless communication network radio control processor cluster with designated signaling links to subtending network elements communicating with one or more radio units.

2. Description of the Prior Art

Modern wireless communication networks, such as cellular telephone systems, personal communication systems, and the like, employ message signaling to provide operational, administrative and maintenance functionality in support of cell base stations that communicate with mobile (or non-mobile) network radio units. When a call is originated from, or terminated to, a radio unit located in a cell managed by a cell base station, a signaling system serving the base station routes signaling messages that enable the base station to perform the necessary call set-up, knockdown, hand-off and paging functions required for wireless cell-based communication. Signaling support may also be implemented for subscriber-specific intelligent network services, such as Call Forwarding, Call Waiting, Three-way Calling, Calling Line Identification and the like.

Existing wireless network signaling systems are implemented using programmed computers. These processing elements are referred to by various names, including "application processors" (APs). They are usually located in a mobile switching center (MSC), or in a base station controller (BSC) if such is in use in the mobile communication network. For convenience, the terms "application processor" and "AP" will be used hereinafter to refer to a signal processing component (described in more detail below) that processes signaling messages on behalf of cell base stations. The use of these terms is not intended to signify any particular architecture or commercial product offering.

In some wireless communication networks, such as the FLEXENT™ system from Lucent Technologies Inc., signaling functions are implemented on behalf of cell base stations by clusters of application processors arranged in a networked environment. The application processors act as network servers that maintain signaling links to the cell base stations, which function as subtending network client elements. Each application processor supports a fixed number of signaling links extending to several subtending cells (of different type and size).

An application processor cluster is a group of application processors that are mounted on a single frame or chassis having one or more power feeds. Often, there are two shelf racks on a frame, each with a separate power feed, that hold two to four application processors, for a total of four to eight application processors per application cluster. Each application processor includes a CPU running multiple instances of the same radio control software (RCS), with each radio control software instance serving one or more cell base stations. By way of example, a single application processor may have anywhere from sixteen to forty-eight (or more) simultaneously executing radio control software instances, depending on the size of cells and the amount of signaling workload they produce.

In order to provide high levels of processor availability, as well as simplified administration and maintenance operations, prior art wireless communication networks typically assign each cell to a pair of application processors, both of which are co-located in the same application processor cluster, but which run off different power feeds. With respect to any given cell to which the application processor pair is connected, one of the application processors acts as the primary processor, and one of its radio control software instances runs in an active mode to handle all of the processing for the subtending cell. The other application processor acts as the secondary processor for the cell, and one of its radio control software instances is placed in a standby mode. This arrangement provides a degree of fail safety. In the event that the primary application processor fails or is taken off-line for maintenance, the secondary processor assumes the load, i.e., its radio control software instance becomes active. To facilitate a rapid transition between the primary and secondary application processors, two signaling links are permanently connected through a switching fabric between the cell and the pair of application processors providing service. Each signaling link typically comprises one DS0 channel of a multi-channel (e.g., T1 or E1) facility.

Although the foregoing redundancy is useful, it imposes a restriction on the distribution of application processors and the rated capacity of the radio control software running thereon. First, because the application processors are paired, a single processor fault (hardware/software/procedural) occurring during planned maintenance operations of the mate processor can interrupt service to all subtending cells. Second, with the paired processor approach, 40–50% of the CPU processing capacity must sit idle during normal operations. That is because each application processor is usually assigned to operate as the primary processor for one group of cells and as the secondary processor for another group of cells. Each application processor thus runs a plurality of primary/active radio control software instances (e.g., eight), and a plurality of secondary/standby radio control software instances (e.g., eight). The secondary/standby radio software instances represent the above-referenced 40–50% idle CPU capacity. This unused CPU capacity is reserved to run the workload of the mate processor in the processor pair in the event that the mate processor fails or is undergoing maintenance.

It will be appreciated that the prior art CPU distribution and recovery approach greatly restricts the rated capacity of the processor elements and the total system capacity for the network. With CPU availability limited by 40–50%, application processor overload can occur as a result of excessive message traffic and over-demand for signaling system functions. This can cause messaging delays and lower quality of service to wireless subscribers. Consider further that as wireless communication networks evolve and end user events migrate geographically, capacity needs and work loads will change. By way of example, some wireless communication network equipment providers plan to introduce modular base stations that will allow customers to change air interface technology and increase cell size and capacity over time. In such high mobility networks, the statically paired application processor approach of the prior art may not be able to sustain the rated processor capacity when more message traffic is generated during the life of a call.

As cells grow and capacity increases for one or more cells, the workload across the pair of processors may no longer be evenly distributed and may exceed the specified normal operating threshold (CPU utilization threshold) required to maintain rated call capacity on the terminating processors. Changes in call load (due to time of day, location or transient local end user/terminal events) can lead to one of the processors being over utilized and the other being under utilized.

Accommodating such workload imbalances in a conventional paired application processor configuration is impractical at best. To redistribute workload evenly, current systems require that the cells be taken off-line so that configuration changes can be made to the facility assignment on the switch connecting the application processors to the subtending cells. Of course, any configuration changes that interrupt service and increase maintenance procedures for wireless communication networks should be avoided.

Accordingly, there is a need in a wireless communication network, and particularly a wireless network implementing clustered application processors providing message signaling support, for improved control of message processing resources in response to changes in message traffic conditions in the the subtending cells. What is required is a message control system that is dynamically configurable in response to changing message traffic conditions in order to promote improved load sharing among operational application processors. In a further aspect, an application processor load sharing arrangement is needed in order to minimize service impairments arising from application processor overload and/or the effects of an interruption in application processor functionality as a result of failure, maintenance operations, or otherwise.

SUMMARY OF THE INVENTION

A solution to the foregoing problem is provided in a wireless communication network that includes a message processing subsystem with at least two programmable application processors providing operational, administrative and maintenance support for one or more cell base stations in the network serving one or more wireless radio units. Improved control of application processor message processing resources is provided in response to message processing workload imbalances as well as application processor shutdown conditions.

In accordance with the invention, a method and apparatus are provided for implementing dynamic load balancing of radio control software to optimize application processor performance and network reliability for varying traffic patterns from subtending cells. The cells may be of generally fixed capacity or they may be "modular," such that their message processing workload can change significantly over time. Multiple radio control software instances corresponding to a group of cells (cell group) run on a group of two (or more) application processors (application processor group) within an application processor cluster. Each radio control software instance has two designations, namely, "active or standby" and "primary or secondary." The active-standby designation determines the mode that a radio control processor runs in at any given moment. The primary-secondary designation determines the mode that a radio control software instance will operate in upon system initialization. Primary radio control software instances start up in the active mode, whereas secondary radio control software instances start up in the standby mode.

In accordance with the first embodiment of the invention, a first application processor in the application processor group runs primary radio control software instances in an "active" mode on behalf of a defined group of cells, and a second application processor in the application processor group runs secondary radio control software instances in a "standby" mode on behalf of the cells. Primary/active radio control software instances running on the first application processor are mated with corresponding secondary/standby radio control software instances running on the second application processor. Each application processor running a primary/active or secondary/standby radio control software instance for a particular cell has a signaling link to that cell connected through a common subtending network switching element.

Each application processor running primary/active radio control software instances for a first group of cells also runs secondary/standby radio control software instances for a second group of cells. Conversely, each application processor running secondary/standby radio control software instances for the first group of cells also runs primary/active radio control software instances for the second group of cells.

In the first preferred embodiment of the invention, the number of primary/active and secondary/standby radio control software instances running on the first and second application processors is fixed during system initialization for a specified system load balancing. For example, the first application processor may run eight primary/active radio control software instances on behalf of a first group of eight cells and the second application processor may run eight secondary/standby radio control software instances on behalf of the first cell group. The first application processor may also run eight secondary/standby radio control software instances on behalf of a second group of eight cells, while the second application processor runs eight primary/active radio control software instances on behalf of the second cell group. As part of dynamic load balancing due to cell capacity growth or periodic increased traffic patterns, the workload on a primary/active radio control software instance running on the first application processor can be swapped with its corresponding secondary/standby radio control software instance running on the second application processors, in order to optimize processor utilization. More specifically, the primary/active radio control software instance running on the first application processor can be redesignated as the standby radio control software instance for a given cell in the first cell group, and the secondary/standby radio control software instance running on the second application processor can be redesignated as the active radio control software instance for the same cell.

In the example given above, the first application processor would now run seven active and nine standby radio control software instances, and the second application processor would run nine active and seven standby radio control software instances. Even though the redesignated radio control software instances are changed between active and standby status, their primary and secondary designations can be left unchanged, in which case, the affected radio control software instances will be reset to their original operational modes upon system reinitialization (e.g., reboot). If it is desired to make the active-standby reconfiguration permanent across reboots, the primary-secondary designations can also be changed in accordance with the first embodiment of the invention. Thus, a primary/active radio control software instance can be redesignated as a secondary/standby radio control software instance, and visa versa.

The above-described dynamic load balancing between application processors can be manual or automatic based on performance bottlenecks in the system. The method can be applied to duplex-processors, fault tolerant (FT) systems, commercial processors, imbedded processors, as well as high availability and clustered solutions. A significant advantage of dynamic load balancing is that CPU utilization can be greatly increased in comparison to prior art systems in order to accommodate changing load conditions.

In a variation of the foregoing, an entire group of RCS instances (either active or standby) can be dynamically moved (re-homed) from one AP to another without taking any cells offline. For example, a group of active RCS instances can be re-homed from an overburdened AP to a less burdened AP. A group of standby RCS instances can be re-homed in order to distribute standby processing across multiple APs, as will now be described relative to a second preferred embodiment of the invention.

In the second preferred embodiment of the invention, a distributed mated-pair application processor arrangement is utilized. In the distributed mated-pair arrangement, one application processor in an application processor group conventionally functions as a primary application processor running primary/active radio control software instances on behalf of a defined group of cells (as well as a secondary processor for other cells). As is also conventional, each cell is nailed-up across, or can receive service from, two application processors. In the distributed mated-pair arrangement, however, the secondary/standby radio control software instances for the defined cell group are fixed (e.g., by re-homing as described above) on multiple secondary application processors to distribute the message processing workload under fault conditions (performance or hardware). By way of example, a primary application processor in an application processor group may run eight primary/active software instances on behalf of a defined cell group, and two secondary application processors in the application processor group may each run four secondary/standby radio control software instances on behalf of the cell group. As in the first preferred embodiment, dynamic load balancing can be used to redistribute the active-standby (or primary-secondary) radio control software instances between the application processors. Should the primary application processor running primary/active radio control software instances for a cell group fail or otherwise be removed from service, the secondary application processors will pick up the message processing load for the cell group, i.e., their secondary/standby radio control software instances for the cell group will become secondary/active radio control software instances for the cell group. Two significant advantages of this arrangement are that (1) increased application processor capacity is available for normal (pre-failure) message processing, and (2) the number of cells impacted by application processor failures is reduced.

BRIEF DESCRIPTION OF THE DRAWING

The foregoing and other features and advantages of the invention will be apparent from the following more particular description of a preferred embodiment of the invention, as illustrated in the accompanying Drawing, in which.

DETAILED DESCRIPTION OF THE PREFERRED EMBODIMENT

Figure 1:
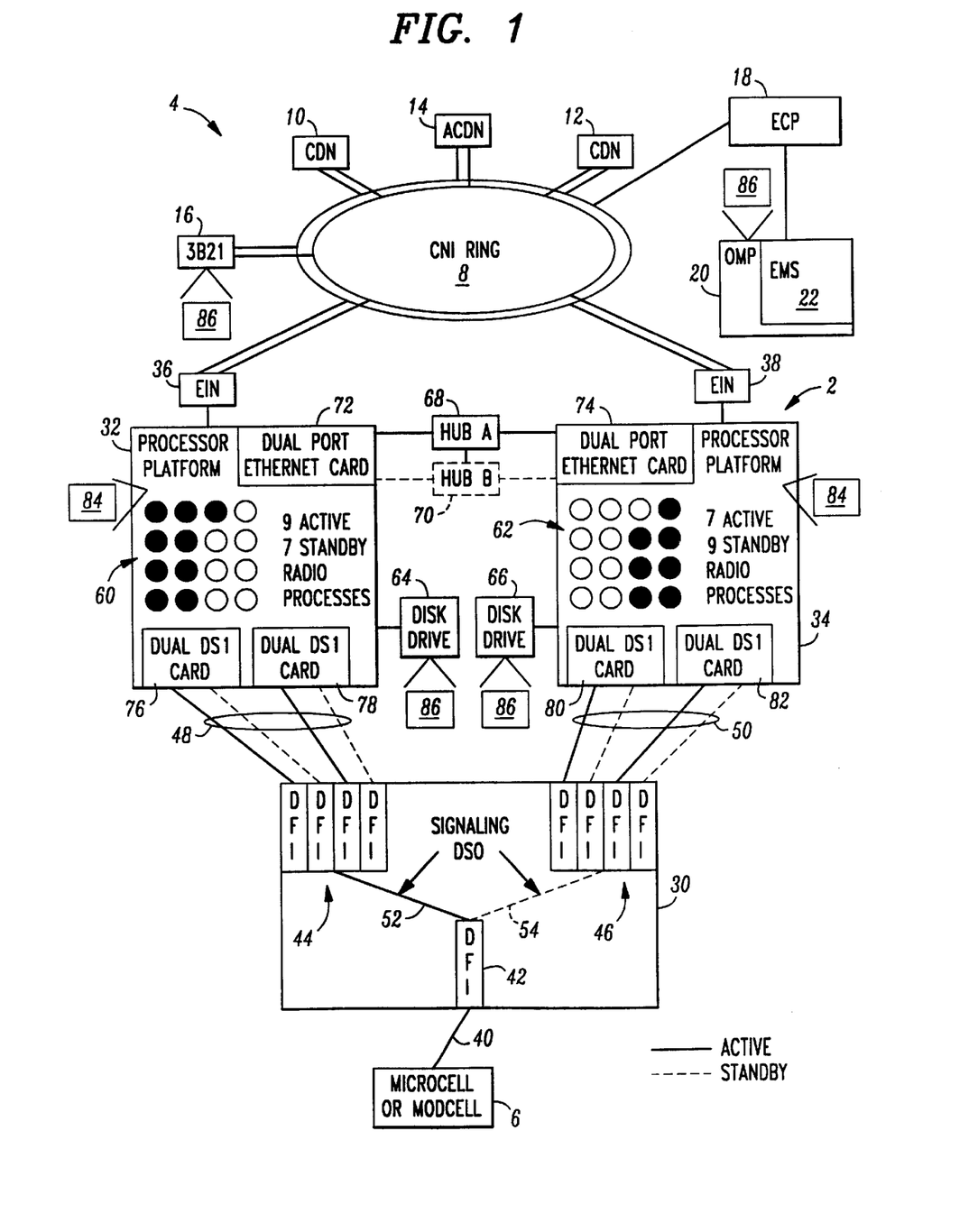
FIG. 1 is a functional block diagram showing elements of an exemplary wireless communication network that supports wireless messaging, and illustrating an implementation of dynamic load balancing in accordance with the first preferred embodiment of the invention wherein message processing workload can be dynamically shifted across a pair of application processors acting on behalf of a group of subtending wireless network cells.

Turning now to the figures, wherein like reference numerals represent like elements in all of the several views, FIG. 1 illustrates an exemplary wireless communication network 2 that is particularly adapted for mobile subscribers. As such, the wireless network 2 includes a mobile switching center (MSC) 4 that provides call support for plural cells, one of which is shown by reference number 6. As is known in the art, each cell in the wireless communication system 2 serves mobile (or non-mobile) radio units operating within a defined geographic area. The cells can be of various type, including conventional minicells, as well as microcells and modular cells ("modcells"). As is known, microcells are especially suited for extending wireless network coverage into high traffic areas, such as buildings, as well as sparsely populated low traffic areas. Modular cells allow service providers to build cells of varying size as a result of the modular design of the cell base station equipment.

As will be understood by persons skilled in the art, the MSC 4 conventionally includes a Common Node Interface (CNI) ring 8 that provides communication between a plurality of ring nodes. These include one or more Call processing Database Nodes (CDN) 10 and 12, an Administrative Call processing Database Node (ACDN) 14, and a 3B21 processor node 16. An Executive Cellular Processor (ECP) 18 and an Operations and Maintenance Processor (OMP) 20 running a user interface front end 22, which could be implemented by way of example only, using the Lucent Technologies Inc. EMS (Element Management System) software product 22. The EMS user interface product is especially suited to allow service providers to configure application processor radio control software. It is contemplated that the dynamic load balancing described herein could be performed manually by system personnel using this interface. Other user interfaces, such as an interface (not shown) provided by the 3B21 processor node 16, could also be used to perform dynamic load balancing as described herein.

The cell 6 communicates with the MSC 4 via a network switching element 30 and a pair of application processors (hereinafter referred to as "AP"s) 32 and 34. Each AP 32 and 34 connects to the CNI ring 8 via an Ethernet Interface Node (EIN) 36 and 38, respectively. An appropriate communication link 40 (such as a T1 or E1 facility) provides two channels (e.g., DS0 channels) dedicated to carrying signaling messages between the cell 6 and the network switching element 30. These channels may also be referred to a primary and secondary links. The switching element itself can be implemented as a Lucent Technologies Inc. 5ESS switch, or the like. It maintains a Digital Facilities Interface (DFI) 42 that terminates one end of the communication link 40 and DFI groups 44 and 46 that terminate communication link groups 48 and 50 extending to the APs 32 and 34, respectively. The DFI 42 routes one signaling channel from the cell 6, shown by reference numeral 52, to the DFI group 44. The other signaling channel from the cell 6, shown by reference numeral 54, is routed to the DFI group 46. It will thus be seen that message traffic to and from the cell 6 can be routed on separate "nailed-up" signaling links respectively extending to the APs 32 and 34.

The APs 32 and 34 are programmed computers that are interconnected to provide a networked message processing environment. Each AP 32 and 34 represents a network server providing message processing services on behalf of multiple subtending cells, representing network clients. The APs 32 and 34 conventionally includes various layers of software functionality. This functionality includes multiple radio control software instances 60 and 62, respectively, labeled as "Radio Processes" in FIG. 1, and hereinafter referred to as "RCS" instances. There are sixteen RCS instances 60 and 62 respectively running on the APs 32 and 34. Upon system initialization, half of the RCS instances 60 and 62 are operated as primary/active instances, and the other half are operated as secondary/standby instances. As described in more detail below, and as part of the first preferred embodiment of the present invention, the active-standby and primary-secondary designations assigned to the RCS instances 60 and 62 can be dynamically adjusted. This is illustrated in FIG. 1, wherein the AP 32 is shown as having nine active RCS instances and seven standby RCS instances, and wherein the AP 34 is shown as having seven active instances and nine standby instances.

Each AP 32 and 34 includes a data storage resource, such as a disk drive 64 connected to the AP 32 and the disk drive 66 connected to the AP 34, for permanent data storage. Inter-processor communication is conducted through a pair of network hubs 68 and 70 that connect to dual port Ethernet cards (or the like) 72 and 74 associated with each AP 32 and 34, respectively. The APs 32 and 34 each further include a pair of dual link termination cards (e.g., dual DS1 cards) 76/78 and 80/82, respectively. The link termination cards 76/78 and 80/82 respectively terminate the link groups 48 and 50, with each link termination card handling, by way of example only, two links carrying two channels.

At system initialization, each link termination card 76, 78, 80 and 82 terminates an equal number of primary and secondary signal channels from the network switching element 30. This can subsequently change as the active-standby or primary-secondary status of the RCS instances 60 and 62 is dynamically adjusted during system operations. Thus, as shown in FIG. 1, the link termination cards 76 and 78 of the AP 32 may collectively carry nine active and seven standby signal channels after dynamic adjustment, while the link termination cards 80 and 82 of the AP 34 collectively carry seven active and nine standby signal channels.

To illustrate the dynamic load balancing functionality of the invention, assume in FIG. 1 that the APs 32 and 34 initially each had eight primary/active RCS instances and eight secondary/standby RCS instances. Assume further that one of the RCS instances of the AP 34 was the primary/active instance for the cell 6 and that one of the RCS instances of the AP 32 was the secondary/standby instance for the cell 6. According to this example, the signaling channel 54 would have been the active signaling channel for the cell 6, and the signaling channel 52 would have been the standby signaling channel for the cell 6.

Assume now that the volume of messaging traffic processing required on behalf of the cell 6 greatly increases as a result of growth, cell re-configuration, or some other factor. Alternatively, assume that some other cell served by an active RCS instance running on the AP 34 experiences an increase in message traffic. In either case, the AP 34 becomes overloaded, whereas the AP 32 remains underutilized.

In accordance with the first preferred embodiment of the invention, a dynamic load balancing adjustment can be made to the processing configuration of the APs 32 and 34, such that active RCS processing for the cell 6 is transferred from the over-utilized AP 34 to the under-utilized AP 32. Advantageously, this load balancing adjustment can be performed without taking the APs 32 and 34 offline, and without disabling any RCS instances running thereon, such that all of the cells served thereby remain online. The post-adjustment load balancing condition of the APs 32 and 34 is shown in FIG. 1. The AP 32 is shown as having nine active and seven standby RCS instances and the AP 34 has seven active and nine standby RCS instances. The signaling channel 52 is now the active signaling link for the cell 6, and the signaling channel 54 is now the standby signaling link for the cell 6.

The foregoing dynamic load balancing can be performed either manually by wireless network operational personnel, or automatically. More specifically, these operations can be performed a manner now to be described. For the manual load balancing operation, the user interface 22 (or any other suitable user interface associated with the MSC 4) can be used. The user interface 22 would provide input to, and receive output from, appropriate cluster administration software 84 that could run on one or both of the APs 32 and 34, or on some other AP within the AP cluster to which the APs 32 and 34 belong. The user interface 22 allows a system operator to issue administrative commands that instruct the cluster administration software 84 to change the active-standby and primary-secondary designations for selected pairs of the RCS instances 60 and 62 that serve a common cell or group of cells. An administrative command to change the active-standby designations for a selected RCS instance pair results in a switch-over of message traffic from the primary/active RCS instance to the secondary/standby RCS instance in the pair so that the work load is thereby shifted.

In one possible implementation of this switch-over operation, the application process space of the original primary/active RCS instance is transferred to the process space of the original secondary/standby RCS instance so that the latter becomes the active process. TCP/IP or open sockets communication can be used to transfer the process space across the Ethernet components 68, 70, 72 and 74. When the original standby RCS instance becomes active, it notifies the cell 6 to transfer active signaling from one channel of the communication link 40 to the other. More specifically, the cell 6 can be configured to respond to any message being sent down the secondary link by switching to the secondary link for all subsequent message traffic. Alternatively, the cell could be programmed to respond to a specific message being sent to it.

It should be noted that the time required to effect the above-described switch-over operation will depend in part on the type of standby mode that is being implemented. For example, a "cold" standby mode may be in effect wherein the standby RCS instance is not run or initialized until load-balancing or recovery is required and the paired active RCS instance is demoted to a standby state. In another implementation, a "warm" standby mode may be utilized wherein the standby RCS instance is initialized (e.g., its links to cells are up and running to improve recovery time) but does not handle calls until load-balancing or recovery is required and the paired active instance is demoted to standby status. In still another implementation, a "hot" standby mode may be used wherein the standby RCS instance is initialized and runs with near real-time state synchronization (to prevent calls from being dropped when an AP fails) but does not handle calls until load-balancing or recovery is required and the paired active instance is demoted to standby status.

As part of the manual load balancing operation, the system operator may also elect to change the primary-secondary designations for the selected RCS pair, so as to make the active-standby designation changeover permanent. In that case, an RCS database 86 that stores the primary-secondary designations for the RCS instances 60 and 62 is updated. Copies of this database could be located anywhere within the MSC 4. For example, one copy of the RCS database 86 could be maintained at the 3B21 processing node 16, particularly if this processing element also provides a user interface for the dynamic load balancing operation. Another copy could be maintained at the OMP 20. Other copies of the RCS database 86 could be respectively stored on the disk drives 64 and 66. The RCS database permanently stores the primary-secondary designations for the RCS instances that it manages. It is provisioned by the service provider to select the primary RCS instance in an RCS pair for active mode operation following system initialization. Thus, the RCS database allows RCS load balancing changes to be maintained across system reboots. As will be understood by persons skilled in the art, many species of database could be used, including a flat configuration file maintained in a conventional (e.g., Unix) file system, or a commercial database product having a standard interface for storing, retrieving and updating records therein.

The dynamic load balancing method of the invention can also be automated. In that case, an administration software process can be run on one or both of the APs 32 and 34, or on some other AP within the AP cluster to which the APs 32 and 34 belong. This administration software would be programmed to perform load balancing when patterns of patterns of performance bottlenecks are recognized in any of the APs within an AP cluster. Such bottlenecks could include dropped calls, high CPU utilization, overload condition/thresholds being reached, and other performance impacting indicators. For example, in one exemplary configuration, the APs in an AP cluster could register with an overload control process that collects information about the CPU time each RCS instance is consuming as compared to total AP CPU usage. This would allow offending RCS instances to be identified and reported to the administration software process. When such bottlenecks are reported, the administration software would switch the active-secondary designations for the affected RCS pair, using the same control mechanisms implemented for the manual load balancing operation. The administration software could also be allowed to change primary-secondary RCS designations based on repeated overloading occurrences. However, such permanent changeovers are more preferably implemented manually.

Figure 2:
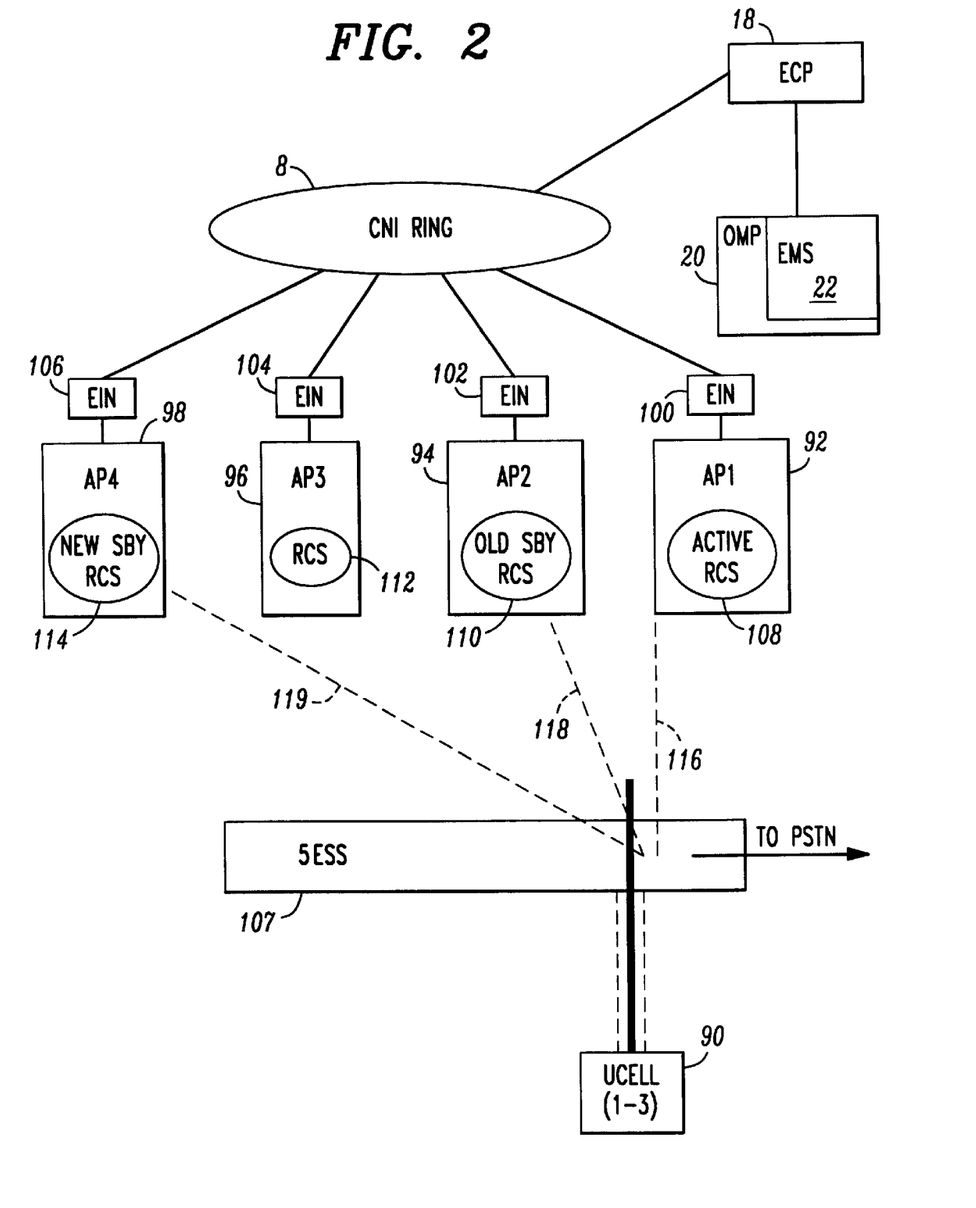
FIG. 2 is another functional block diagram showing elements of an exemplary wireless communication network that supports wireless messaging, and illustrating another implementation of dynamic load balancing in accordance with a variation of the first preferred embodiment of the invention wherein message processing workload can be dynamically shifted (re-homed) across a pair of application processors acting on behalf of a group of subtending wireless network cells.

Turning now to FIG. 2, an alternative form of dynamic load balancing is illustrated wherein a secondary/standby RCS instance in an RCS pair is re-homed from one AP to another. FIG. 2 also illustrates the use of a single RCS pair to control multiple cells (e.g., micro-cells) rather than the usual case where an RCS pair controls only one cell. Thus, in FIG. 2, there is a micro-cell group 90 that, by way of example only, is assumed to comprise three micro-cells. FIG. 2 also illustrates four APs—AP1, AP2, AP3 and AP4—respectively identified by reference numerals 92, 94, 96 and 98. The APs 92, 94, 96 and 98 are respectively connected to the CNI ring 8 via Ethernet Interface Nodes 100, 102, 104 and 106. A network switching element 107 establishes signaling message connections between the cell group 90 and the APs 100, 102, 104 and 106. Each of the APs 100, 102, 104 and 106 respectively runs RCS instances 108, 110, 112 and 114. Initially, an active signaling link 116 connects the micro-cell group 90 to the primary/active RCS instance 108, and a standby signaling link 118 connects the micro-cell group 90 to the secondary/standby RCS instance 110.

Assume, by way of example, that the RCS instance 108 operating on the AP 92 is designated as the primary/active RCS instance for the micro-cell group 90. Assume further that the RCS instance 110 operating on the AP 110 is designated as the secondary/standby RCS instance for the cell group 90. If the AP 94 becomes overloaded due to the primary/active RCS instances (not shown) that it runs, additional processing capacity can be obtained by re-homing the secondary/standby RCS instance 110 for the micro-cell group 90 from the AP 94 to another AP. Alternatively, the secondary/standby RCS instance 110 could be re-homed in order to provide a distributed mated-pair environment, as described below relative to FIG. 3. FIG. 2 illustrates the RCS instance 110 being deleted and reconstituted on the AP 98 as a new RCS instance 114 that acts as the secondary/standby RCS instance for the micro-cell group 90. In similar fashion, the primary RCS 108 for the micro-cell group 90 could also be moved from the AP 92 to another AP, if for example, the AP 92 becomes overloaded.

Advantageously, the micro-cell group 90 need not be taken off line during the RCS change-over. Utilizing the user interface 22, or any other suitable user interface, such as an interface (not shown) located at the 3B21 processor node 16, network personnel can perform on-line reconfiguration of RCS instances. This reconfiguration capability hinges on the ability of the cluster administration software 84 to update file entries in the database 86 relative to the AP 92 running the primary/active RCS instance 108, the AP 94 running the old secondary/standby RCS instance 110, and the AP 98 that will run the new secondary/standby RCS instance 114. Once the database file entries are updated, the switching element 107 can be instructed to nail up a new secondary link from the micro-cell group 90 to the new AP 98. The new secondary/standby RCS instance 114 may then be brought up into whatever standby mode is desired (e.g., cold standby, warm standby, or hot standby). Note that the foregoing procedure can also be used to transfer an active RCS instance from one AP to another. In that case, however, the earlier-described active-standby switch-over operation is performed beforehand to convert the active RCS instance to be moved to a standby RCS instance, while its mated standby RCS instance temporarily becomes the active RCS instance. When the former active RCS instance has been demoted to standby status, it can be moved while the former standby RCS instance performs active processing. During this time period, the cell is effectively switched from a duplex processing arrangement to a simplex processing arrangement. Once the former active RCS instance has been moved, it can be redesignated as the active RCS instance, while the former standby RCS instance is again returned to standby status.

Figure 3:
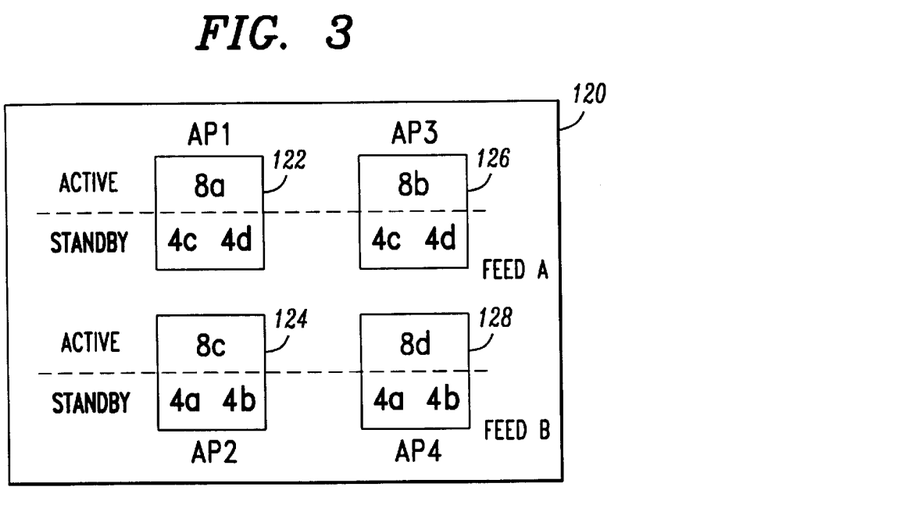
FIGS. 3 and 4 are functional block diagrams showing an application (radio control) processor cluster that could be used to support wireless messaging in the mobile wireless communication networks of FIGS. 1 or 2, and illustrating an implementation of a distributed mated-pair application processor arrangement in accordance with the second preferred embodiment of the invention.
Figure 4:
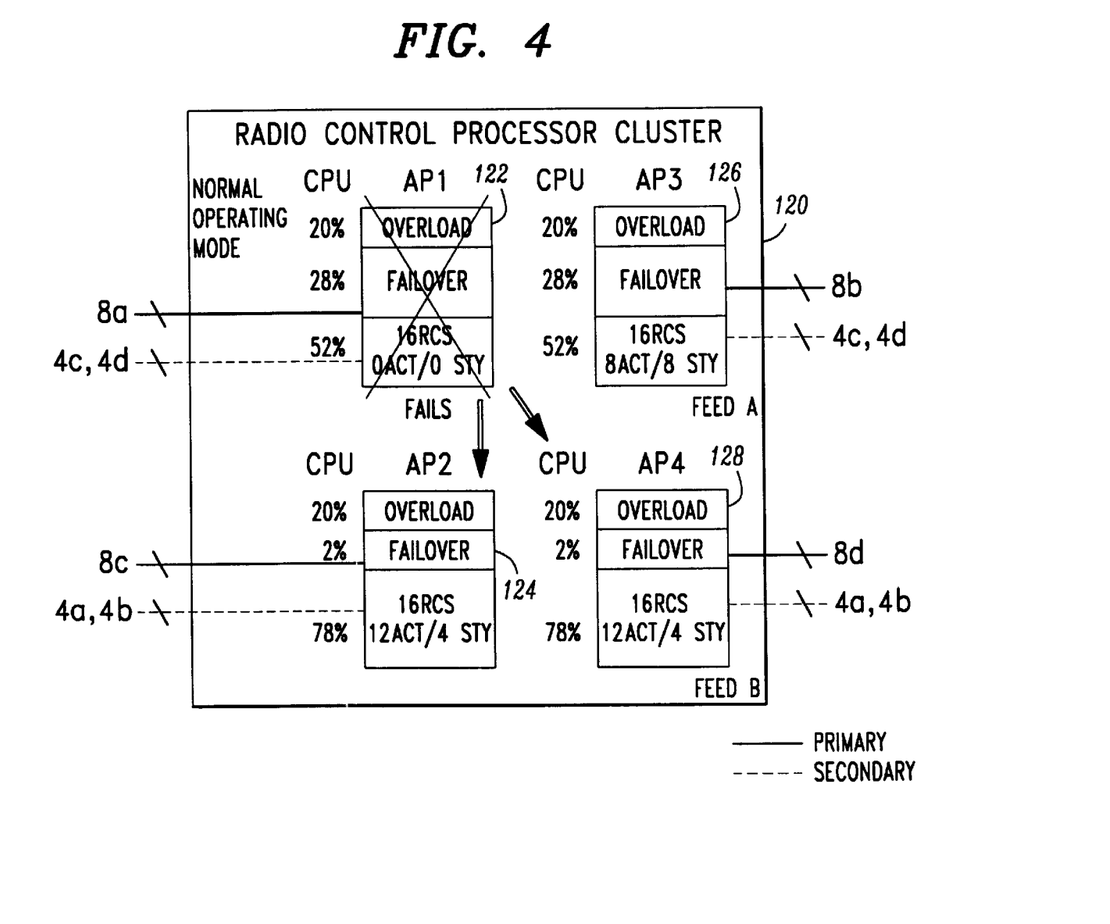

Turning now to FIGS. 3 and 4, a second preferred embodiment of the invention is shown for implementing a distributed mated-pair processor arrangement. FIG. 3 illustrates an AP cluster 120 comprising four APs—AP1, AP2, AP3 and AP4—shown respectively by reference numerals 122, 124, 126 and 128. The APs 122, 124, 126 and 128 can be fed by different power sources depending on the configuration implemented by the wireless network service provider. By way of example, each AP could be provided with two power feeds to provide maximum fail safety. More commonly, however, half of the APs would be connected to one power feed while the others are connected to another power feed. For example, the APs 122 and 124 might be connected to one power feed while the APs 126 and 128 are connected to another power feed. Alternatively, the APs 122 and 126 might be connected to one power feed, while the APs 124 and 128 are connected to another power feed. This is the configuration shown in FIG. 3, in which one power source, labeled "Feed A," powers APs 122 and 126, and another power source, labeled "Feed B," powers APs 124 and 128. This configuration would be typical where, for example, the APs 122 and 126 are located on a first shelf in an AP cluster cabinet or housing, and the APs 124 and 128 are located on a second shelf in the AP cluster cabinet or housing.

Each AP 122, 124, 126 and 128 initially runs an equal number of primary/active and secondary/standby RCS instances. For example, each AP could initially run eight primary/active RCS instances and eight secondary/standby RCS instances. This is shown in FIG. 3, wherein the APs 122, 126, 124 and 128 respectively run eight primary/active RCS instances for cell groups "a," "b," "c," and "d" (not shown). The eight primary/active RCS instances for each of the aforementioned cell groups are designated in FIG. 3 by the reference numerals "8a," "8b," "8c," and "8d."

Each AP 122, 124, 126 and 128 also runs plural secondary/standby RCS instances. However, instead of running eight such instances for a single cell group, each AP runs four secondary/standby radio software instances for two cell groups. This allows the secondary/standby RCS instances for a particular cell group to be distributed across two APs. Should one AP fail or otherwise become inactive, its active RCS functions will be picked up by two of the remaining APs (sometimes referred to hereinafter as "failover" APs). This is shown in FIG. 4, which illustrates the effect of a failure on the AP 122. The processing functions of this failed AP's eight primary/active RCS instances are distributed equally to the failover APs 124 and 128, such that no cells are impacted by the single AP failure. Rather, the APs 124 and 128 simply operate with twelve active RCS instances and four standby RCS instances. Note that this increase in processing load can be absorbed by the APs 124 and 128 by reserving a default amount of "Failover" processing margin in each AP.

By way of example only, FIG. 4 illustrates the use of a Failover margin of 28%. Assuming a 20% "Overhead" margin is also maintained (for message processing overload control), 52% of the capacity of each AP is available for normal (pre-failure), primary/active RCS operation in the configuration of FIGS. 3 and 4. Importantly, this AP utilization rate represents an increase in the 40% processing capacity available for pre-failure, primary/active RCS operations in prior art paired AP systems. If more failover APs are used in the distributed mated-pair arrangement described herein, additional processing capacity can be provided for pre-failure, primary/active RCS operations. By way of example only, a distributed mated-pair arrangement with three failover APs would allow a 60% processor utilization rate for pre-failure, primary/active RCS operations in each AP.

Preferably, the APs that run the secondary/standby RCS instances for a given cell group are connected to a different power feed than the AP that runs the primary/active RCS instances for the same cell group. FIG. 3 provides illustration. As shown therein, and by way of example only, the APs 122 and 126 each run four secondary/standby RCS instances for the cell group "c" (labeled "4c") and four secondary/standby RCS instances for the cell group "d" (labeled "4d"). Note that these APs run on the power source labeled "Feed A" whereas the APs 124 and 128, which run the primary/active RCS instances for the cell groups "c" and "d," run on the power source labeled "Feed B." Similarly, the APs 124 and 128 each run four secondary/standby RCS instances for the cell group "a" (labeled "4a") and four secondary/standby RCS instances for the cell group "b" (labeled "4b"). Note that these APs run on the power source labeled "Feed B" whereas the APs 122 and 126, which run the primary/active RCS instances for the cell groups "a" and "b," run on the power source labeled "Feed A." Should either of the power feeds shown in FIG. 3 fail, it will be seen that message processing for any affected cell group can be quickly reestablished by activating the secondary RCS instances running on the APs connected to the remaining power feed, such that they become secondary/active RCS instances. In other words, a multiple AP failure across a single power feed will have no impact on subtending cells.

A worst case failure mode occurs when one AP is temporarily out of service (e.g., for maintenance), and one of the failover APs fails, thus resulting in two-way processor failure. In the prior art paired processor arrangement, all of the cells served by failed AP pair would be impacted. However, in the distributed mated-pair arrangement of FIGS. 3 and 4, at least half of the supported cells would remain operational. Still fewer cells would be impacted if additional failover APs were added. Indeed, it is expected that the second embodiment of the invention described herein can increase reliability by reducing the maximum cell failure group size by 50–75% depending on the number of processors used. Using a reliability metric based on the impacted number of cells, a 2-way processor failure within the same AP pair in a conventional paired processor arrangement will impact n cells (i.e., cells with primary and secondary links to both processors). However, with a distributed mated-pair arrangement, a 2-way processor failure within the same AP mated-pair group will impact n/2, n/4, n/8, etc. cells (and never n cells) depending on the number of secondary APs running standby RCS instances for the primary AP.

Accordingly, a message control system for a wireless communication network has been described that includes at least two APs, and implements dynamic load balancing and distributed mated-pair processor redundancy. The invention provides an architecture for maximizing performance and reliability of RCS service in an MSC or BSC. The invention allows a hosting AP to utilize at least 30%–60% more CPU capacity than in prior art systems lacking dynamic load balancing capability or distributed mated-pair functionality. The invention will enable capacity maintenance operations to be performed on-line for subtending cells by allowing system administrators to change the active-standby or primary-secondary designations for selected RCS instances running on APs within an assigned group of APs. The load can be re-assigned (balanced) between any number of processors without taking any cells off-line or moving communication link facilities. AP CPU thresholds are thus easily tunable to accommodate different numbers of APs in an AP group.

Supporting up to 8 active and 8 secondary RCS instances on each AP in a simple two processor arrangement can lead to 65,536 (2 to the power of 16) combinations of workload distribution and even more in four or eight processor arrangements. When the load balancing of RCS instances is automated, the MSC or BSC environment is moved toward the goal of being system-managed where conscious operator intervention for ensuring optimal levels of performance or reliability will be the exception rather than the rule.

The invention also offers cost reduction/smaller footprint opportunities when network capacity is a performance consideration. This is important for modular cell types that can grow (increase capacity) overtime. Under such conditions, the invention can reduce the number of processors required to provide the same level of service as prior art systems.

While various embodiments have been disclosed, it should be apparent that many variations and alternative embodiments could be implemented in accordance with the invention. It is understood, therefore, that the invention is not to be in any way limited except in accordance with the spirit of the appended claims and their equivalents.

What is claimed is:

1. In a wireless communication network that includes a message processing system providing operational, administrative and maintenance support for one or more cells in the network serving one or more radio units, the message processing system including at least two programmable application processors (APs), each of which runs one or more active radio control software (RCS) instances on behalf of a defined cell group and one or more standby RCS instances on behalf of at least one other cell group that is different than the cell group served by the AP's active RCS instances, and further wherein each cell served by the message processing system is connected to a pair of APs, one of which runs an active RCS instance on behalf of the cell and the other of which runs a standby RCS instance on behalf of the cell, a method for performing dynamic load balancing during system operation between a pair of APs (AP pair) serving at least one cell in common, comprising the steps of:

selecting, relative to at least one cell served by the AP pair, a first RCS instance running on one member of the AP pair as an active RCS instance for said at least one cell and a second RCS instance running on the other member of the AP pair as a standby RCS instance for said at least one cell;

redesignating said first RCS instance as a new standby RCS instance for said at least one cell;

redesignating said second RCS instance as a new active RCS instance for said at least one cell; and transferring active message processing from said first RCS instance to said second RCS instance during network operation and without service interruption to said at least one cell.

2. A method in accordance with claim 1 wherein said first RCS instance is originally designated as a primary RCS instance and said second RCS instance is originally designated as a secondary RCS instance, said primary designation indicating that upon initialization of said wireless communication network, an RCS instance should be run in the active mode, and said secondary designation indicating that upon initialization of said wireless communication network, an RCS instance should be run in the standby mode, said method further including the steps of:

redesignating said first RCS instance as a new secondary RCS instance for said at least one cell;

redesignating said second RCS instance as a new primary RCS instance for said at least one cell; and utilizing said primary-secondary redesignations to make said active-standby redesignations persistent across reboots of said wireless communication network.

3. A method in accordance with claim 2 wherein said selecting and redesignating steps are initiated manually.

4. A method in accordance with claim 2 wherein said primary and secondary designations for said first and second RCS instances are stored in a database.

5. A method in accordance with claim 1 wherein said selecting and redesignating steps are initiated automatically.

6. A method in accordance with claim 1 wherein said first and second RCS instances communicate with said at least one cell on a pair of first and second communication links, said first communication link being an active link prior to said redesignation steps carrying message traffic between said at least one cell and said first RCS and said second communication link being a standby link prior to said redesignation steps that carries no message traffic between said at least one cell and said second RCS instance.

7. A method in accordance with claim 6 wherein said transferring step includes:

transferring the process space from said first RCS instance to said second RCS instance via an inter-AP network while continuing to communicate message traffic over said first communication link; and notifying said at least one cell to begin communicating message traffic over said second communication link.

8. A method in accordance with claim 1 further including the step of relocating said first or second RCS instance from one member of said AP pair to a different AP so as to form a new AP pair running active and standby RCS instances on behalf of said at least one cell.

9. A method in accordance with claim 1 wherein said wireless communication network includes a first AP running plural active RCS instances on behalf of a defined cell group and at least two additional APs running standby RCS instances on behalf of said defined cell group, each of which is paired with one of said active RCS instances running on said first AP, whereby a distributed mated-pair processing arrangement is provided.

10. A method in accordance with claim 9 wherein said first AP is powered by a first power feed and said at least two additional APs are powered by a second power feed.

11. In a wireless communication network that includes a message processing system providing operational, administrative and maintenance support for one or more cells in the network serving one or more radio units, the message processing system including at least two programmable application processors (APs), each of which runs one or more active radio control software (RCS) instances on behalf of a defined cell group and one or more standby RCS instances on behalf of at least one other cell group that is different than the cell group served by the AP's active RCS instances, and further wherein each cell served by the message processing system is connected to a pair of APs, one of which runs an active RCS instance on behalf of the cell and the other of which runs a standby RCS instance on behalf of the cell, a system for performing dynamic load balancing between a pair of APs (AP pair) serving at least one cell in common, comprising:

means for selecting, relative to at least one cell served by the AP pair, a first RCS instance running on one member of the AP pair as an active RCS instance for said at least one cell and a second RCS instance running on the other member of the AP pair as a standby RCS instance for said at least one cell;

first means for redesignating said first RCS instance as a new standby RCS instance for said at least one cell;

second means for redesignating said second RCS instance as a new active RCS instance for said at least one cell; and transfer means for transferring active message processing from said first RCS instance to said second RCS instance during network operation and without service interruption to said at least one cell.

12. A system in accordance with claim 11 wherein said first RCS instance is originally designated as a primary RCS instance and said second RCS instance is originally designated as a secondary RCS instance, said primary designation indicating that upon initialization of said wireless communication network, an RCS instance should be run in the active mode, and said secondary designation indicating that upon initialization of said wireless communication network, an RCS instance should be run in the standby mode, said system further including:

third means for redesignating said first RCS instance as a new secondary RCS instance for said at least one cell;

fourth means for redesignating said second RCS instance as a new primary RCS instance for said at least one cell; and utilizing said primary-secondary redesignations to make said active-standby redesignations persistent across reboots of said wireless communication.

13. A system in accordance with claim 12 wherein operation of said selecting means and said first, second, third and fourth redesignating means is initiated manually.

14. A system in accordance with claim 12 wherein said primary and secondary designations for said first and second RCS instances are stored in a database.

15. A system in accordance with claim 11 wherein operation of said selecting means and said first, second, third and fourth redesignating means is initiated automatically.

16. A system in accordance with claim 11 wherein said first and second RCS instances communicate with said at least one cell on a pair of first and second communication links, said first communication link being an active link prior to implementation of said first and second redesignation means carrying message traffic between said at least one cell and said first RCS and said second communication link being a standby link prior to operation of said redesignation means that carries no message traffic between said at least one cell and said second RCS instance.

17. A system in accordance with claim 16 wherein said redesignation means include:

means for transferring the process space from said first RCS instance to said second RCS instance via an inter-AP network while continuing to communicate message traffic over said first communication link; and means for notifying said at least one cell to begin communicating message traffic over said second communication link.

18. A system in accordance with claim 11 further including the means for relocating said first or second RCS instance from one member of said AP pair to a different AP so as to form a new AP pair running active and standby RCS instances on behalf of said at least one cell.

19. A system in accordance with claim 11 wherein said wireless communication network includes a first AP running plural active RCS instances on behalf of a defined cell group and at least two additional APs running standby RCS instances on behalf of said defined cell group, each of which is paired with one of said active RCS instances running on said first AP, whereby a distributed mated-pair processing arrangement is provided.

20. A system in accordance with claim 19 wherein said first AP is powered by a first power feed and said at least two additional APs are powered by a second power feed.

21. A message processing system for a wireless communication service network, comprising:

a plurality of application processors;

a first group of said application processors being powered by a first power feed a second group of said application processors being powered by a second power feed;

each of said application processors running one or more radio control software instances;

a first one of said radio control software instances running on an application processor in said first group being mated with a second radio control software instance running on another application processor in said second group to provide message processing services on behalf of a cell in said wireless communication network;

said first and second radio control software instances being assigned respective primary/active and secondary/standby designations, said active and standby designations determining which of said first and second radio control software instances performs active message processing on behalf of said cell and said primary and secondary designations determining the operational mode (active or standby) of said first and second radio control software instances during system initialization;

first means for exchanging active and standby designations between said first and second radio control software instances during system operation, so that the message processing workload on behalf of said cell is transferred from one of said first and second radio control software instances to the other;

second means for exchanging primary and secondary designations between said first and second radio control software instances during system operation to effect a permanent transfer of message processing workload from one of said first and second radio control software instances to the other; and whereby message processing can be transferred between said first and second radio control software instances without services interruption to said cell and said message processing transfer can be made persistent across reboots of said system.

* * * * *